3,361,861
PROCESS FOR PREPARING FILMS AND
RELATED ARTICLES
Floriana Bertinotti and Ezio Danielli, Terni, Italy,
assignors to Montecatini Edison S.p.A., Milan, Italy
Filed Feb. 13, 1964, Ser. No. 344,597
Claims priority, application Italy, Feb. 15, 1963,
3,287/63
6 Claims. (Cl. 264—210)

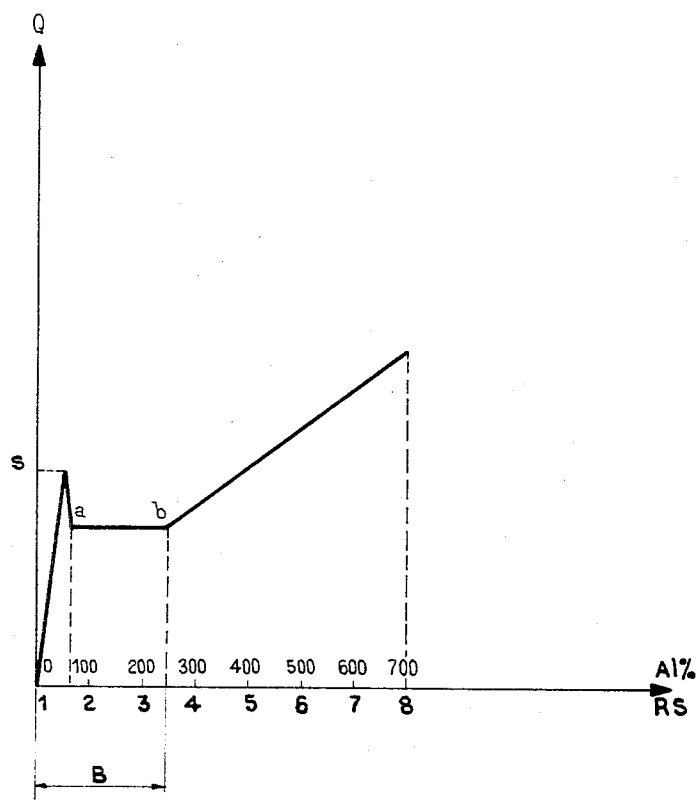

ABSTRACT OF THE DISCLOSURE

Preparing thermoplastic films of isotactic alpha-olefin polymers having balanced mechanical and physical properties by extruding a film of such polymer and subjecting the extruded film to:

(a) a pre-heating at temperatures between 40° and 90° C.;
(b) a transverse stretching at temperatures between 80° and 110° C. with a stretching ratio between 1:1.1 and 1:1.6; and
(c) a dimensional stabilization under conditions of complete prevention of shrinkage at temperatures between 50° and 110° C.

---

This invention relates to a process for preparing flat films having high and balanced mechanical and physical characteristics and to the articles thus obtained. More particularly, it pertains to such flat films prepared from linear alpha-olefin polymers essentially consisting of isotactic macromolecules.

It is known that the flat films obtained by extrusion of molten polymers show anisotropy of some mechanical characteristics with respect to the machine direction (MD) and to the transverse direction (TD) at 90° to the machine direction. The cause of this anisotropy is the tendency for parallel orientation of the mean axis of the polymeric chains caused by stretching the film in the extrusion and made more marked by successive quenching.

The influence of this partial distension of the molecules is particularly evident if the values of tear strength and of tensile strength, which appear to be considerably different in the two directions, are taken into consideration. It is also known that, in the absence of stretching in extrusion, the films can have almost the same mechanical and physical characteristics in the two directions, but these characteristics are very poor.

The characteristics, in general, appear to improve by orienting the polymeric chains. This may be achieved by stretching in one direction, or in two perpendicular directions, the amount of stretching being equal to or higher than the natural stretching ratio.

In general, an unoriented film of thermoplastic material when stretched shows a behavior similar to that represented in the figure, in which loads Q are reported on the ordinates, and the percent elongation (A$l$ percent) and the corresponding stretching ratios RS on the abscissae. As can be seen from the figure, immediately after the yield point S there is a portion a–b in which elongation A$l$ (or deformation) increases without increasing load Q. This corresponds to necking all along the film being stretched. Under these conditions the film is subjected to a stretching which cannot be controlled. This stretching is indicated by the line B and is called "natural stretching."

In prior Italian Patent No. 594,971 in the name of Montecatini there are described bi-oriented films obtained by stretching the films in two perpendicular directions, however, with stretching ratios equal to or higher than the natural stretching ratio B.

It is known that ratios lower than the natural stretching ratio lead to disuniformly stretched film.

An object of the present invention is a process for preparing films having high balanced and regular physical and mechanical characteristics after deformation in the Hookian region.

Another object of the invention are the films prevailingly consisting of alpha-olefin polymers, more particularly of polypropylene essentially consisting of isotactic macromolecules, stretched at stretching ratio lower than the stretching ratio corresponding to the yield stress.

We have surprisingly found, and it is another object of this invention, that it is possible to obtain films from linear alpha-olefin polymers, more particularly from polypropylene, which have higher and more balanced mechanical and physical characteristics, with respect to the extruded film from which they are prepared, by first preheating the extruded films, then subjecting them to a deformation of the elastic type, below the yield deformation, and then stabilizing this deformation by means of a thermal treatment.

The films subjected to the process of this invention also have a low coefficient of friction and very low blocking tendencies.

The process of this invention is characterized by the following operations:

(1) pre-heating of the polyolefin film at temperatures between 40° and 90° C.;
(2) transverse stretching of the film at temperatures between 80° and 110° C. by 1.1 to 1.6 times its initial width;
(3) dimensional stabilization under conditions of completely hindered shrinkage at temperatures between 50° and 110° C.

Films obtained by extrusion (through linear die) of alpha-olefin polymers essentially consisting of isotactic macromolecules, either alone or in admixture with stabilizers, lubricants, antistatic agents, pigments and the like, can be subjected to the process of this invention.

According to a preferred embodiment, the films are subjected to a quenching at low temperature, preferably at a temperature lower than 20° C., after extrusion.

The films may have previously undergone a longitudinal stretching during the extrusion.

The process of this invention can be carried out in any continuous stretching machine with a wide range of speed.

The alpha-olefin polymer films of this invention are also characterized by coefficients of friction (in the absence of specific additives) lower than 1, by a tensile strength in both the perpendicular directions higher than 4.5 kg./mm.$^2$, by an impact strength at −10° C. higher than 3 kg./cm., by a tear strength balanced in both directions and also by low values of elongation at break, by good optical characteristics and by very low blocking tendencies.

The films of this invention may be suitably coated with a coating agent for use in the field of packing, with or without electric, chemical and flame treatments.

Various modifications and variations may be made in the details of the practical realization of this invention without departing from the spirit and the scope of the invention.

The following examples are presented to further illustrate the invention without limiting its scope.

*Examples 1–3*

A film was prepared by extruding, at 260° C., a polypropylene substantially consisting of isotactic macromolecules and having an intrinsic viscosity $[\eta]$ of 1.7 (determined in tetrahydronaphthalene at 135° C.), an ash content of 0.01% and a residue after heptane extraction of 95%. The extruded film, having a thickness of 32 microns, was pre-heated, transversely stretched and then subjected to a dimensional stabilization treatment. The operating data and the characteristics of the film are reported in Table 1.

TABLE 1

|  | Film as cast | Ex. 1 | Ex. 2 | Ex. 3 |
|---|---|---|---|---|
| Stretching ratio |  | 1:1.35 | 1:1.40 | 1:1.15 |
| Pre-heating temperature, ° C |  | 50 | 50 | 50 |
| Stretching temperature, ° C |  | 90 | 90 | 90 |
| Dimensional stabilization temperature, ° C |  | 90 | 110 | 50 |
| Feeding speed, m./min |  | 25 | 25 | 25 |
| Thickness, μ | 32 | 25 | 25 | 25 |
| Crystallinity, percent | Absent | 30–35 | 45 | 30 |
| Elmendorf tear strength, g./mm.: |  |  |  |  |
| Longitudinal | 25 | 110 | 120 | 70 |
| Transverse | 1,000 | 400 | 300 | 500 |
| Yield point, kg./mm.²: |  |  |  |  |
| Longitudinal | 2 | 3 | 3.2 | 3 |
| Transverse | 2 | 3 | 3.2 | 3 |
| Elongation at the yield point, percent: |  |  |  |  |
| Longitudinal | 8 | 11 | 11 | 10 |
| Transverse | 14 | 14 | 14 | 13 |
| Tensile strength, kg./mm.²: |  |  |  |  |
| Longitudinal | 6 | 8 | 7.5 | 6.5 |
| Transverse | 3.5 | 6 | 6 | 4.8 |
| Elongation at break, percent: |  |  |  |  |
| Longitudinal | 500 | 300 | 350 | 350 |
| Transverse | 500 | 400 | 300 | 350 |
| Tensile modulus, kg./mm.²: |  |  |  |  |
| Longitudinal | 80 | 95 | 100 | 85 |
| Transverse | 80 | 90 | 100 | 80 |
| Tensile impact strength, kg./cm.: |  |  |  |  |
| At 25° C | 9 | 17 | 22 | 13 |
| At −10° C | <3 | 8+10 | 8+10 | 8+10 |
| Coefficient of friction* | 1 | 0.7 | 0.3 | 0.6 |
| Haze, percent | 2 | 2 | 2 | 2 |
| Gloss, percent | 136 | 136 | 136 | 136 |

*Determined on slip tester of "Testing Machines Incorporated" (ITM).
NOTE.—The crystallinity is determined by X-ray examination.

*Example 4*

A film having a thickness of 50 microns was prepared by using the polypropylene of Examples 1–3. The film was pre-heated, transversely stretched and then subjected to a dimensional stabilization treatment. The operating conditions of the treatment and the physical and mechanical characteristics are reported in Table 2.

TABLE 2

|  | Film as cast | Example 4 |
|---|---|---|
| Stretching ratio |  | 1:1.2 |
| Pre-heating temperature, ° C |  | 50 |
| Stretching temperature, ° C |  | 90 |
| Dimensional stabilization temperature, ° C |  | 90 |
| Feeding speed, m./min |  | 25 |
| Thickness, μ | 50 | 45 |
| Crystallinity, percent | Absent | 35+45 |
| Elmendorf tear strength, g./mm.: |  |  |
| Longitudinal | 40+50 | 100+200 |
| Transverse | 100+200 | 20 |
| Yield point, kg./mm.²: |  |  |
| Longitudinal | 1.8 | 2.5 |
| Transverse | 1.9 | 2.9 |
| Elongation at the yield point, percent: |  |  |
| Longitudinal | 13 | 17 |
| Transverse | 13 | 17 |
| Tensile strength, kg./mm.²: |  |  |
| Longitudinal | 5 | 4+5 |
| Transverse | 3+4 | 5 |
| Elongation at break, percent: |  |  |
| Longitudinal | 700 | 500 |
| Transverse | 600 | 500 |
| Tensile modulus, kg./cm.²: |  |  |
| Longitudinal | 65 | 90+100 |
| Transverse | 70 | 90+100 |
| Tensile impact strength, kg./cm.: |  |  |
| At 25° C | 30 | 20 |
| At −10° C | 5 | 5+11 |
| Coefficient of friction* | 2.7 | 0.5 |
| Haze, percent | 1.5 | 2 |
| Gloss, percent | 140 | 140 |

*Determined on slip tester of "Testing Machines Incorporated" (ITM).

What is claimed is:

1. A process for preparing extruded film having balanced mechanical and physical characteristics, which process comprises extruding a thermoplastic film of an isotactic alpha-olefin polymer and thereafter
   pre-heating said extruded thermoplastic film at a temperature between 40° and 90° C.;
   stretching said pre-heated film in a transverse direction at a temperature between 80° and 110° C. with a stretching ratio between 1:1.1 and 1:1.6; and
   dimensionally stabilizing said stretched film under condition of complete-prevention of shrinkage at a temperature between 50° and 110° C.

2. The process of claim 1 wherein the extruded film prevailingly consists of polypropylene substantially comprising isotactic macromolecules.

3. The process of claim 1 wherein said thermoplastic film is quenched at a temperature lower than 20° C. immediately after extrusion.

4. The process of claim 1 wherein said extrusion is in the longitudinal direction of said film whereby said film is stretched longitudinally during the extrusion step.

5. The process of claim 1 wherein the extruded film consists of alpha-olefin polymers in admixture with stabilizers, lubricants and antistatic agents.

6. A film consisting essentially of an isotactic poly-alpha-olefin having balanced physical and mechanical characteristics obtained by the process of claim 1.

References Cited

UNITED STATES PATENTS

| 3,146,284 | 8/1964 | Markwood | 264—210 |
| 2,975,484 | 3/1961 | Amborski. | |
| 3,214,503 | 10/1965 | Markwood | 264—288 |

FOREIGN PATENTS

| 918,497 | 2/1963 | Great Britain. |
| 892,079 | 3/1962 | Great Britain. |
| 918,722 | 2/1963 | Great Britain. |

DONALD J. ARNOLD, *Primary Examiner.*

ALEXANDER H. BRODMERKEL, *Examiner.*

J. WOO, *Assistant Examiner.*